(12) United States Patent
Armiroli

(10) Patent No.: US 12,377,719 B2
(45) Date of Patent: Aug. 5, 2025

(54) DRIVE DEVICE FOR A DRIVE SHAFT COMPRISING TWO ROTATING MACHINES

(71) Applicant: Valeo eAutomotive Germany GmbH, Erlangen (DE)

(72) Inventor: Paul Armiroli, Creteil (FR)

(73) Assignee: Valeo eAutomotive Germany GmbH, Erlangen (DE)

( * ) Notice: Subject to any disclaimer, the term of this patent is extended or adjusted under 35 U.S.C. 154(b) by 0 days.

(21) Appl. No.: 18/917,279

(22) Filed: Oct. 16, 2024

(65) Prior Publication Data

US 2025/0121664 A1 Apr. 17, 2025

(51) Int. Cl.
| | |
|---|---|
| *B60K 7/00* | (2006.01) |
| *B60K 1/02* | (2006.01) |
| *B60K 17/16* | (2006.01) |
| *F16H 37/08* | (2006.01) |
| *F16H 48/06* | (2006.01) |

(52) U.S. Cl.
CPC .............. *B60K 1/02* (2013.01); *B60K 17/165* (2013.01); *F16H 37/0806* (2013.01); *B60K 2007/0092* (2013.01); *F16H 48/06* (2013.01)

(58) Field of Classification Search
CPC B60K 1/02; B60K 17/165; B60K 2007/0092; F16H 37/0806; F16H 48/06
See application file for complete search history.

(56) References Cited

U.S. PATENT DOCUMENTS

| | | | | |
|---|---|---|---|---|
| 2009/0197727 | A1* | 8/2009 | Janson | B60K 6/485 |
| | | | | 903/910 |
| 2011/0212803 | A1* | 9/2011 | Maas | B60K 17/04 |
| | | | | 475/149 |
| 2024/0351418 | A1* | 10/2024 | Schilder | B60K 1/02 |

FOREIGN PATENT DOCUMENTS

| | | |
|---|---|---|
| CN | 108909426 A | 11/2018 |
| CN | 115257334 A | 11/2022 |
| DE | 102019207784 A1 * | 12/2020 |
| DE | 10 2021 004 236 A1 | 2/2023 |
| WO | WO-2020120721 A1 * | 6/2020 |

OTHER PUBLICATIONS

Preliminary French Search Report issued Apr. 22, 2024 in French Application 2311205 filed on Oct. 17, 2023, 9 pages (with English Translation of Categories of Cited Documents & Written Opinion).

* cited by examiner

*Primary Examiner* — Justin Holmes
(74) *Attorney, Agent, or Firm* — Oblon, McClelland, Maier & Neustadt, L.L.P.

(57) ABSTRACT

A drive device includes a frame, a first rotating machine including a fixed part and a rotating part, and a second machine including a fixed part and a rotating part configured to transmit a second torque. A planetary gear train includes a first ring gear, a sun gear and a planet carrier which can rotate with respect to the first ring gear, the rotating part of the first rotating machine being fixed with the planet carrier. Also included is a drive shaft, a differential configured to transmit a resulting torque to the drive shaft. The rotating part of the second machine transmits the second torque to the differential.

20 Claims, 2 Drawing Sheets

DRIVE DEVICE FOR A DRIVE SHAFT COMPRISING TWO ROTATING MACHINES

TECHNICAL AREA

The present invention relates to the technical field of electric vehicles.

More particularly, the invention concerns the technical field of wheel drive devices for such electric vehicles.

STATE OF THE ART

It is known from the state of the art that a vehicle comprises a drive device in which a first rotating machine is configured to drive in rotation a drive shaft fixed with the wheels of said vehicle. When it is desired to allow the wheels of the vehicle to rotate at different speeds, it is also known to insert a differential between the rotating machine and the wheels, particularly when the vehicle is negotiating a curve.

To increase the mechanical torque received by the wheels of the vehicle, for example to overcome an obstacle such as a slope, it is known to interpose between the rotating machine and the drive shaft, a plurality of gears, allowing to multiply the mechanical torque generated by the said rotating machine. Such gears can, for example, be arranged within an planetary gear train, enabling the speed of rotation of the electric machine to be increased, as well as increased torque at the wheels by increasing the ratio between the speed of the wheels and the speed of the machine, while offering a high degree of compactness. However, in some applications, the use of an planetary gear train does not allow the wheels to receive an acceptable mechanical torque. To increase the resulting mechanical torque, it is then necessary to replace the rotating machine with a more powerful one.

The invention aims to remedy some or all of the disadvantages of the state of the art by providing a drive device that generates a higher resultant torque and also has a more compact and reliable architecture.

PRESENTATION OF THE INVENTION

More specifically, the invention relates to a mechanical shaft drive device comprising:
- a frame;
- a first rotating machine comprising a fixed part fixed with the frame and a rotating part configured to transmit a first mechanical torque;
- a second rotating machine comprising a fixed part fixed with the frame and a rotating part configured to transmit a second mechanical torque;
- a first planetary gear train comprising a first ring gear fixed with the frame, a sun gear mobile in rotation with respect to the ring gear and a planet carrier mobile in rotation with respect to the ring gear, the rotating part of the first rotating machine being integral in rotation with the planet carrier of the planetary gear train;
- a drive shaft configured to transmit a resulting torque,
- a differential arranged between the first planetary gear train and the drive shaft in the sense of torque transmission, comprising a second ring gear rotationally fixed to the sun gear of the first planetary gear train, the differential being configured to transmit a resultant torque to the drive shaft, The drive is remarkable in that the rotating part of the second rotating machine transmits the second torque to the differential.

According to the invention, the fixed part comprises at least one stator. The rotating part comprises at least one rotor. The first rotating machine and the second machine may be identical. The first rotating machine or the second machine may be different.

Thanks to this combination of features, the drive device can rotate a single drive shaft using two rotating machines running in the same direction. In such a configuration, the reliability of such a drive device is significantly increased, as the drive shaft can be driven despite any damage to one of the two rotating machines.

Advantageously, the first ring gear is arranged between the fixed part of the first rotating machine and the fixed part of the second machine. In such a configuration, each rotating machine is positioned axially on a given side of the differential and the first planetary gear train to transmit the first and second torques to the differential.

Advantageously, the rotating part of the second rotating machine is rotationally fixed to the drive shaft. In such a configuration, the resultant torque transmitted to the drive shaft is the sum of the first mechanical torque generated by the first rotating machine and the second mechanical torque generated by the second rotating machine. In this way, it is possible to obtain a higher resultant mechanical torque, in particular by controlling the two rotating machines so that each operates at an operating point that maximizes its efficiency. The term "operating point" refers to the configuration of an electrical machine at a given rotational speed for a given mechanical torque.

Advantageously, the drive device comprises a gearbox connecting the rotating part of the second rotating machine to the drive shaft.

Advantageously, the rotating part of the second rotating machine is integral in rotation with the planet carrier of the first planetary gearbox. In such a configuration, the speed of rotation of the two rotating parts is identical. The resultant torque transmitted to the shaft is the sum of the mechanical torques of the first and second machines to the shaft. The torque of each machine can be different, particularly if the structure and/or control are different between the two electrical machines. In addition, the distribution of mechanical torque on the drive shaft is achieved at different application points, favoring the service life of the drive shaft.

Advantageously, the rotating part of the first rotating machine and the rotating part of the second rotating machine are coaxial.

Advantageously, the differential is arranged radially inside the first planetary gear train. In such a configuration, the compactness of the drive device is improved.

Advantageously, the first rotating machine is an axial-flow electric motor. Preferably, the first rotating machine rotates at a speed in excess of 20,000 rpm.

Advantageously, the second rotating machine is an axial-flow electric motor or a wheel motor.

Advantageously, the second ring gear is a differential output pinion. Advantageously, the second ring gear is a differential casing. The differential gearbox comprises, for example, a differential ring gear.

Advantageously, when the first and/or second machine is an axial-flow machine, the fixed part comprises two stators framing a rotor. Several rotors can be provided, each framed by two stators. The stators can be fixed to each other and completely encapsulate the rotor. The rotor may comprise permanent magnets that require no external excitation. Bearings can be arranged between the stators and the drive shaft, or between the stators and the planet carrier.

According to another aspect of the invention, it relates to a mobility machine comprising a drive device according to any one of the claims. The mobility device is, for example, an electric vehicle comprising two electric motors driving a drive shaft.

PRESENTATION OF FIGURES

The invention will be better understood on reading the following description, which is given by way of example only, with reference to the annexed drawings, which are given as non-limiting examples, in which identical references are given to similar objects and in which.

It should be noted that the figures set out the invention in detail to enable the invention to be implemented; although non-limiting, the said figures serve in particular to better define the invention where appropriate.

DETAILED DESCRIPTION OF THE INVENTION

Figure 1:
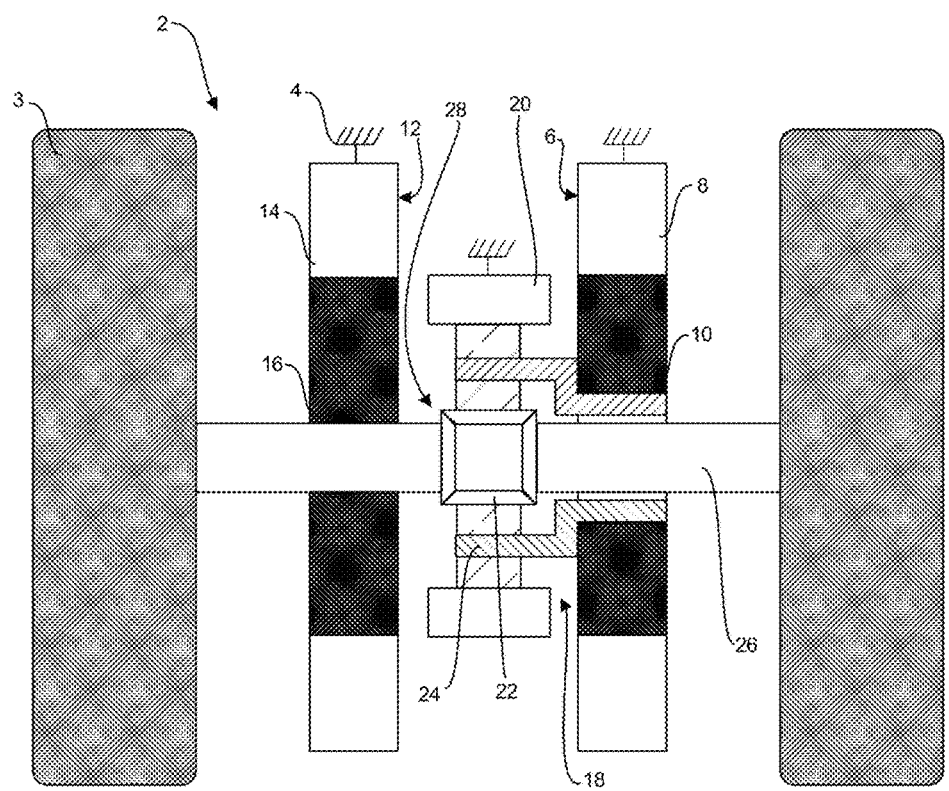
FIG. 1 is a schematic cross-sectional view of a drive device according to a first embodiment of the invention.

The invention relates in particular to a drive device 2 for an electric vehicle, as illustrated in FIG. 1 according to a first embodiment. The drive device 2 comprises a frame 4. The frame 4 is a fixed element with respect to the structure of the electric vehicle, for example fixed with a chassis of said vehicle. Here, the drive device 2 is configured to rotate wheels 3 of the electric vehicle, via a resultant torque transmitted by a drive shaft 26 of the drive device 2. In the case of an electric vehicle with four wheels 3, the drive device 2 is arranged either between two wheels 3 forming a front axle of the vehicle or a rear axle of the vehicle.

The drive device 2 comprises a first rotating machine 6 comprising a fixed part 8 fixed with the frame 4 and a rotating part 10, rotatable and configured to transmit a first mechanical torque, said first torque being generated by the first rotating machine 6. Preferably, the first rotating machine 6 is an electric motor, more preferably an axial flux electric motor.

The drive device 2 comprises a second rotating machine 12 comprising a fixed part 14 fixed with the frame 4 and a rotating part 16, rotatable and configured to transmit a second mechanical torque, said second torque being generated by the second rotating machine 12.

Preferably, the second rotating machine 12 is an electric motor, more preferably an axial-flow electric motor. Alternatively, the second rotating machine 12 is a wheel motor.

The drive device 2 also includes a first planetary gear train 18. The first planetary gear train 18 comprises a first ring gear 20, fixed to the frame 4, a sun gear 22, rotatable relative to the first ring gear 20, and a planet carrier 24, rotatable relative to the first ring gear 20. In particular, the sun gear 22 and the planet carrier 24 are coaxial and mechanically linked, via planet gears.

The planet carrier 24 is rotationally fixed to the rotating part 10 of the first rotating machine 8, so that the rotating part 10 transmits the first mechanical torque to the planet carrier 24.

The drive device 2 also includes a differential 28. The differential 28 is arranged between the first planetary gear train 18 and the drive shaft 26 in the sense of torque transmission. The differential 28 comprises a ring gear which is rotationally fixed to the sun gear 22 of the first planetary gear train. In addition, the rotating part 16 of the second rotating machine 12 transmits the second torque to the differential 28. In other words, differential 28 is configured to transmit the resulting torque to drive shaft 26.

The drive shaft 26 naturally comprises a first half-shaft and a second half-shaft, the two half-shaft being mechanically connected via the differential 28. The differential 28 then transmits the resulting torque to each of the two half-shafts of the drive shaft 26. Conversely, each half-shaft can transmit torque to the differential 28.

In the embodiment described here, the first ring gear 20 is advantageously arranged between the fixed part 8 of the first rotating machine 6 and the fixed part 14 of the second rotating machine 12. In such a configuration, each rotating machine 6, 12 is positioned axially on a given side of the differential 28 and the first planetary gear train to transmit the first mechanical torque and the second mechanical torque to the differential 28.

The drive device 2 enables the drive shaft 26 to be rotated by two rotating machines 6, 12, rotating in the same direction. In such a configuration, the reliability of such a drive device 2 is significantly increased, as the drive shaft 26 can be driven in spite of a possible failure of one of the two rotating machines 6, 12. Indeed, in the event of damage to the first rotating machine 6, the wheels 3 receive a torque from the drive shaft equivalent to the second mechanical torque generated by the second rotating machine 12. Conversely, in the event of damage to the second rotating machine 12, the wheels 3 receive a torque resulting from the drive shaft equivalent to the first mechanical torque, generated by the first rotating machine 6.

In the embodiment described here, the rotating part 10 of the first rotating machine 6 and the rotating part 16 of the second rotating machine 12 are coaxial.

Here, the differential 28 is advantageously arranged radially inside the first planetary gear train 18, improving the compactness of the drive device 2.

As shown in FIG. 1, the rotating part 16 of the second rotating machine 12 is connected to the drive shaft for rotation. The resultant torque transmitted to the drive shaft 26 is then the sum of the first mechanical torque generated by the first rotating machine 6 and the second mechanical torque generated by the second rotating machine 12. In this way, it is possible to obtain a higher resultant mechanical torque, in particular by controlling the two rotating machines 6,12 so that each operates at an operating point that maximizes its efficiency. The term "operating point" refers to the configuration of an electrical machine at a given rotational speed for a given mechanical torque. In this configuration, the second torque is then transmitted to the differential 28 via the drive shaft 26, in particular to transmit the resulting torque to the half-shaft axially opposite the second machine 12 with respect to the differential 28.

Figure 2:
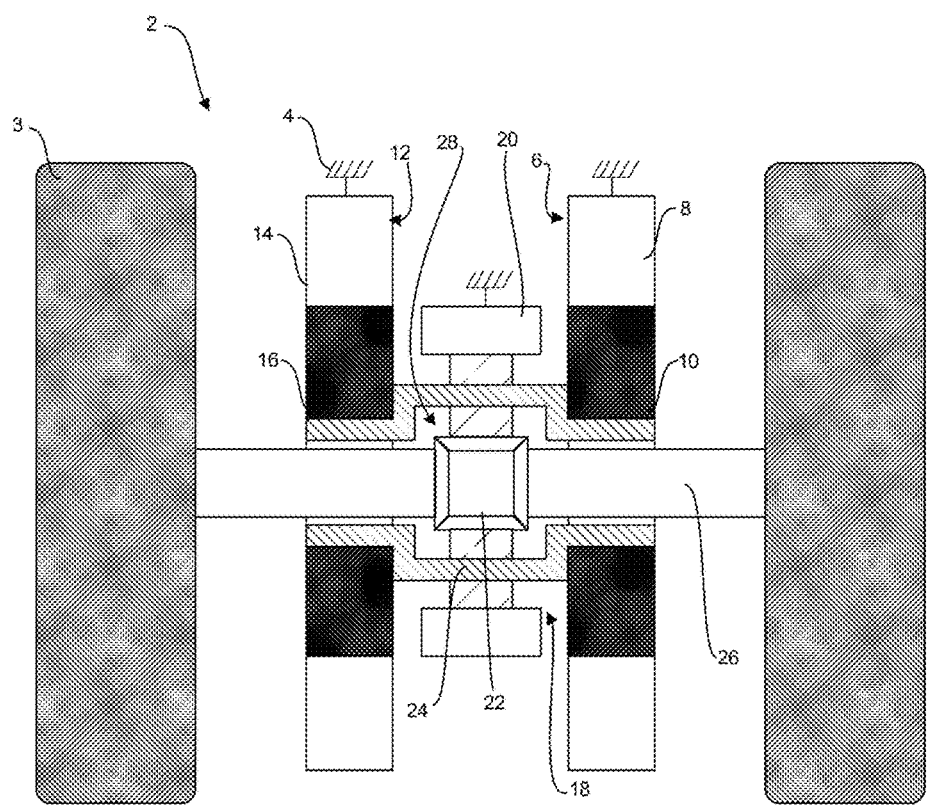
FIG. 2 is a schematic cross-sectional view of a drive device according to a second embodiment of the invention.

FIG. 2 describes the drive device 2 in a second embodiment. The drive device described in FIG. 2 differs from that shown in FIG. 1 in that the rotating part 16 of the second rotating machine 12 is non-rotatably connected to the planet carrier 24 of the first planetary gear train 18. The resulting torque is then transmitted to the differential 28 entirely via the first planetary gear train 18. The resultant torque transmitted to drive shaft 26 is the sum of the mechanical torques of the first and second machines. Both rotating machines 6,12 rotate the same mechanical element. In this way, a mechanical torque is distributed to the drive shaft 26 at different points of application, thus extending the service life of the drive shaft. Torque transmission between the second machine and drive shaft 26 is achieved without additional gearing. In this case, both machines run at the same speed.

Figure 3:
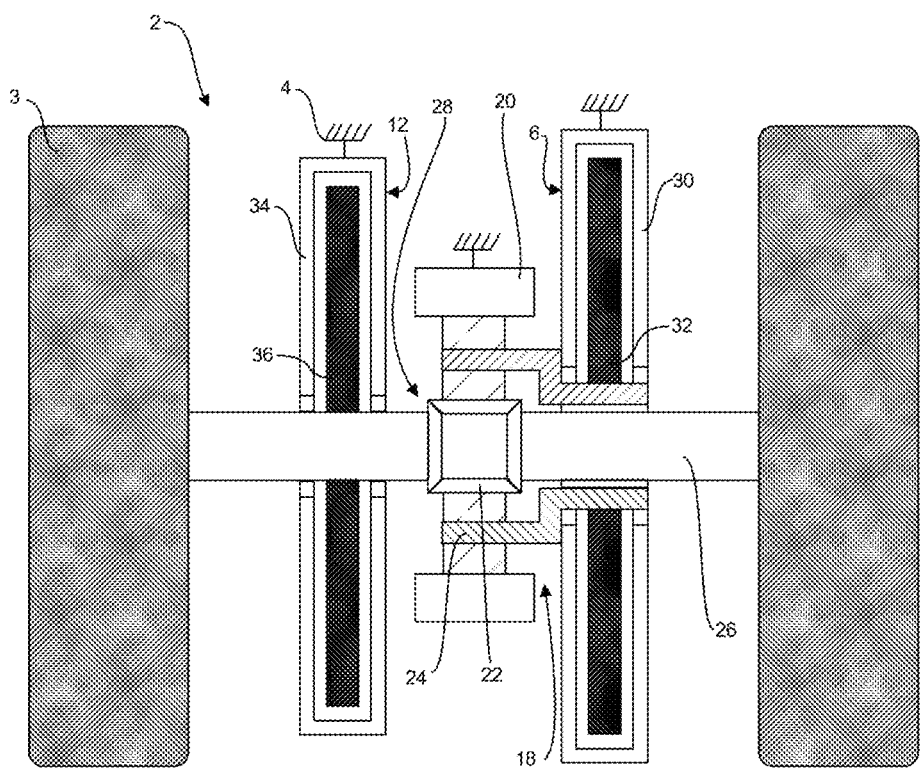
FIG. 3 is a schematic cross-sectional view of a drive device according to a variant of the embodiment shown in FIG. 1.
Figure 4:
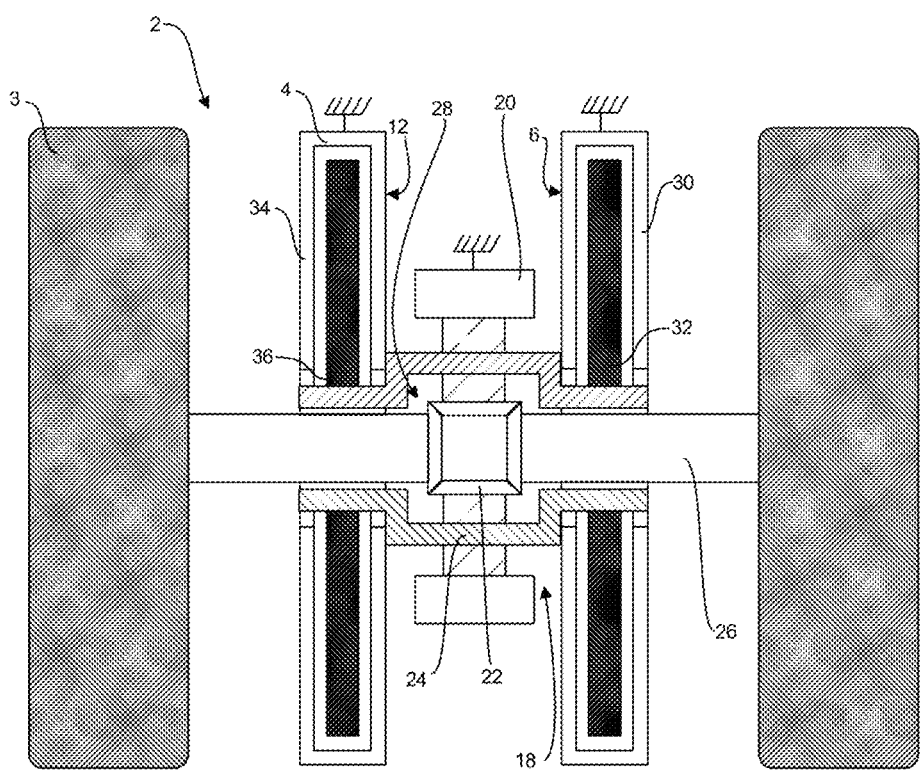
FIG. 4 is a schematic cross-sectional view of a drive device according to a variant of the design shown in FIG. 2.

FIG. 3 illustrates drive device 1 according to a variant of the design shown in FIG. 1, and FIG. 4 illustrates drive device 1 according to a variant of the design shown in FIG. 2. In FIG. 3 and FIG. 4, the first rotating machine 6 and the second rotating machine 6 are axial-flow electrical machines. In this configuration, the fixed part 8 of the first rotating machine 6 comprises at least one stator 30 fixed with the frame 4, and the rotating part 10 of the first rotating machine 6 comprises at least one rotor 32 configured to transmit the first mechanical torque. The fixed part 8 of the first rotating machine 6 may comprise two stators 30 flanking the rotor 32. The rotating part 10 of the first rotating machine 6 may comprise several rotors 32, each framed by the two stators 30. Each rotor 32 may comprise permanent magnets that require no external excitation. The stators 30, for example, have a half-cylinder shape, and can be fixed in such a way as to completely frame the rotor(s) 30, in particular by means of a radial fold of each of the half-cylinders. One of the stators 30 may be fixed with the frame 4 or, alternatively, each of the stators 30 may be integral directly with the frame 4, for example in a housing of the frame 4.

The fixed part 14 of the second machine 12 comprises at least one stator 34 fixed with the frame 4, and the rotating part 16 of the second machine 12 comprises at least one rotor 36 configured to transmit the first mechanical torque. The fixed part 14 of the second machine 12 may comprise two stators 34 flanking the rotor 36. The rotating part 16 of the second machine 12 may comprise several rotors 36, each framed by the two stators 34. Each rotor 36 may comprise permanent magnets that require no external excitation. The stators 34 are, for example, half-cylinder-shaped, and can be fixed so as to completely frame the rotor(s) 36, in particular by means of a radial fold of each of the half-cylinders. One of the stators 34 may be fixed with the frame 4, or alternatively, each of the stators 34 may be integral directly with the frame 4, for example in a housing of the frame 4.

It should also be noted that the invention is not limited to the above-described embodiments. Indeed, it will be apparent to the skilled person that various modifications can be made to the embodiment described above, in the light of the teaching just disclosed.

For example, in the embodiment described in FIG. 1, an additional (non-illustrated) gearbox can be arranged between the rotating part 16 of the second rotating machine 12 and the drive shaft 26. The gearbox may, for example, be a second planetary gear.

The drive device 1 may also include bearings, for example mechanical bearings such as ball or roller bearings (not illustrated). In the variant described in FIG. 3, a first bearing can advantageously be arranged between the stator 30 and the planet carrier 24 of the first rotating machine 6, i.e. an inner ring of said first bearing is fixed with the planet carrier 24 and an outer ring of said first bearing is fixed with the stator 30 of the first rotating machine 6. A second bearing can advantageously be arranged between the stator 34 of the second machine 12 and the drive shaft 26, i.e. an inner ring of said second bearing is fixed with the drive shaft 26 and an outer ring is fixed with the stator 34 of the second machine 12.

In the variant shown in FIG. 4, each bearing can advantageously be arranged between the stators 30, 34 and the planet carrier 24, i.e. an inner ring of each bearing is fixed with the planet carrier 24 and an outer ring of each bearing is fixed with the stators 30, 34.

In the detailed presentation of the invention given above, the terms used should not be interpreted as limiting the invention to the embodiment set out in the present description, but should be construed to include all equivalents the anticipation of which is within the grasp of the person skilled in the art by applying his general knowledge to the implementation of the teaching just disclosed to him.

The invention claimed is:

1. Drive device comprising:
   a frame;
   a first rotating machine comprising a fixed part fixed with the frame and a rotating part configured to transmit a first mechanical torque;
   a second rotating machine comprising a fixed part fixed with the frame and a rotating part configured to transmit a second mechanical torque;
   a first planetary gear train comprising a first ring gear fixed with the frame, a sun gear rotatable relative to the first ring gear and a planet carrier rotatable relative to the first ring gear, the rotating part of the first rotating machine being integral in rotation with the planet carrier of the planetary gear train;
   a drive shaft configured to transmit a resulting torque; and
   a differential arranged between the first planetary gear train and the drive shaft in the torque transmission direction, comprising a second ring gear rotationally fixed to the sun gear of the first planetary gear train, the differential being configured to transmit a resultant torque to the drive shaft,
   the drive device being characterized in that the rotating part of the second rotating machine transmits the second mechanical torque to the differential.

2. Drive device according to claim 1, with the first ring gear arranged between the fixed part of the first rotating machine and the fixed part of the second rotating machine.

3. Drive device according to claim 2, in which the rotating part of the second rotating machine is rotationally fixed to the drive shaft.

4. Drive device according to claim 2, in which the rotating part of the second rotating machine is rotationally fixed to the planet carrier of the first planetary gear train.

5. Drive device according to claim 2, in which the rotating part of the first rotating machine and the rotating part of the second rotating machine are coaxial.

6. Drive device according to claim 2, in which the differential is radially arranged inside the first planetary gear train.

7. Drive device according to claim 2, in which the first rotating machine is an axial-flow electric motor.

8. Drive device according to claim 2, wherein the second rotating machine is an axial-flow electric motor or a wheel motor.

9. Electric vehicle comprising a drive device according to claim 2.

10. Drive device according to claim 1, in which the rotating part of the second rotating machine is rotationally fixed to the drive shaft.

11. Drive device according to claim 10, comprising a gearbox connecting the rotating part of the second rotating machine to the drive shaft.

12. Drive device according to claim 10, in which the rotating part of the first rotating machine and the rotating part of the second rotating machine are coaxial.

13. Drive device according to claim 10, in which the differential is radially arranged inside the first planetary gear train.

14. Drive device according to claim 10, in which the first rotating machine is an axial-flow electric motor.

15. Drive device according to claim 1, in which the rotating part of the second rotating machine is rotationally fixed to the planet carrier of the first planetary gear train.

16. Drive device according to claim 1, in which the rotating part of the first rotating machine and the rotating part of the second rotating machine are coaxial.

17. Drive device according to claim 1, in which the differential is radially arranged inside the first planetary gear train.

18. Drive device according to claim 1, in which the first rotating machine is an axial-flow electric motor.

19. Drive device according to claim 1, wherein the second rotating machine is an axial-flow electric motor or a wheel motor.

20. Electric vehicle comprising a drive device according to claim 1.

* * * * *

UNITED STATES PATENT AND TRADEMARK OFFICE
CERTIFICATE OF CORRECTION

| | | |
|---|---|---|
| PATENT NO. | : 12,377,719 B2 | Page 1 of 1 |
| APPLICATION NO. | : 18/917279 | |
| DATED | : August 5, 2025 | |
| INVENTOR(S) | : Paul Armiroli | |

It is certified that error appears in the above-identified patent and that said Letters Patent is hereby corrected as shown below:

On the Title Page

Item (30) should be added after Item (65). Item (30) should read:
--(30) Foreign Application Priority Data
Oct. 17, 2023 (FR)...........2311205--

Signed and Sealed this
Twenty-third Day of December, 2025

John A. Squires
*Director of the United States Patent and Trademark Office*